United States Patent
Zhu et al.

(10) Patent No.: US 11,104,831 B2
(45) Date of Patent: Aug. 31, 2021

(54) HIGH MODULUS URETHANE ADHESIVE COMPOSITIONS, MANUFACTURE AND USE THEREOF

(71) Applicant: DDP SPECIALTY ELECTRONIC MATERIALS US, LLC, Wilmington, DE (US)

(72) Inventors: Huide D. Zhu, Rochester, MI (US); Andrew R. Kneisel, Clarkston, MI (US); Daniel P. Sophiea, Lake Orion, MI (US)

(73) Assignee: DDP SPECIALTY ELECTRONIC MATERIALS US, LLC, Wilmington, DE (US)

(*) Notice: Subject to any disclaimer, the term of this patent is extended or adjusted under 35 U.S.C. 154(b) by 0 days.

(21) Appl. No.: 16/590,824

(22) Filed: Oct. 2, 2019

(65) Prior Publication Data
US 2020/0032118 A1    Jan. 30, 2020

Related U.S. Application Data

(63) Continuation of application No. 14/391,180, filed as application No. PCT/US2013/037684 on Apr. 23, 2013, now abandoned.

(60) Provisional application No. 61/650,189, filed on May 22, 2012.

(51) Int. Cl.
| | | |
|---|---|---|
| *C09J 175/08* | (2006.01) | |
| *C08G 18/12* | (2006.01) | |
| *C08G 18/20* | (2006.01) | |
| *C08G 18/48* | (2006.01) | |
| *C09J 11/06* | (2006.01) | |

(52) U.S. Cl.
CPC ............ *C09J 175/08* (2013.01); *C08G 18/12* (2013.01); *C08G 18/2018* (2013.01); *C08G 18/2081* (2013.01); *C08G 18/4825* (2013.01); *C08G 18/4829* (2013.01); *C09J 11/06* (2013.01)

(58) Field of Classification Search
CPC .............. C08G 18/12; C08G 18/2081; C08G 18/2018; C08G 18/4825; C08G 18/4829; C09J 175/08; C09J 11/06
See application file for complete search history.

(56) References Cited

U.S. PATENT DOCUMENTS

| | | |
|---|---|---|
| 4,780,520 A | 10/1988 | Rizk et al. |
| 5,747,581 A | 5/1998 | Proebster et al. |
| 5,922,809 A | 7/1999 | Bhat et al. |
| 5,976,305 A | 11/1999 | Bhat et al. |
| 6,015,475 A | 1/2000 | Hsieh et al. |
| 7,892,395 B2 | 2/2011 | Tribelhorn et al. |
| 2006/0079661 A1 | 4/2006 | Zhu et al. |
| 2006/0096694 A1 | 5/2006 | Zhou |
| 2008/0221245 A1 | 9/2008 | Huang et al. |
| 2009/0044907 A1 | 2/2009 | Tribelhorn et al. |
| 2011/0198030 A1 | 8/2011 | Burckhardt |

FOREIGN PATENT DOCUMENTS

EP    1811006 A1    7/2007

OTHER PUBLICATIONS

Joseph, G., Purbond AG, EP1811006 Abstract, "Adhesive System", Jul. 25, 2007.

*Primary Examiner* — Patrick D Niland
(74) *Attorney, Agent, or Firm* — Hong Xu

(57) ABSTRACT

The invention relates to a urethane adhesive composition having high modulus and is pump transferable at room temperature.

7 Claims, 1 Drawing Sheet

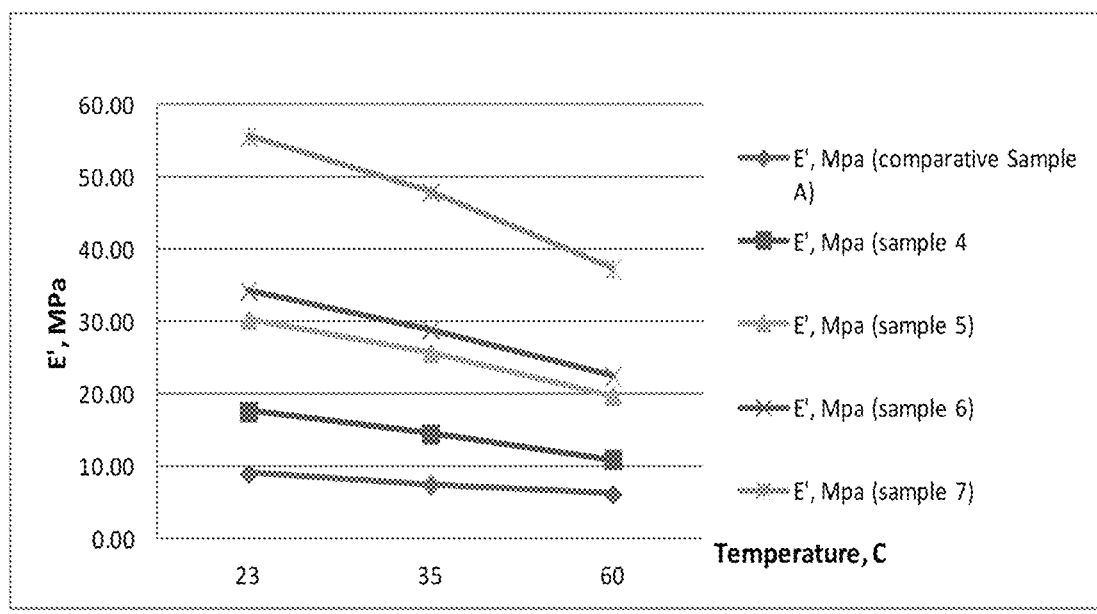
E' versus temperature for Samples 4 to 7 and Comparative Sample A.

HIGH MODULUS URETHANE ADHESIVE COMPOSITIONS, MANUFACTURE AND USE THEREOF

CROSS-REFERENCE TO RELATED APPLICATIONS

This application is a continuation of U.S. patent application Ser. No. 14/391,180, filed Oct. 8, 2014, which is a U.S. National Phase application of International Application No. PCT/US2013/037684, filed Apr. 23, 2013, which claims the benefit of U.S. Provisional Patent Application No. 61/650,189, filed May 22, 2012, each of which are hereby incorporated by reference in their entirety.

FIELD OF THE INVENTION

The present invention relates to a urethane adhesive composition having high modulus and is pump transferable at room temperature.

INTRODUCTION

Urethane adhesive compositions are used in many industries. For example, in the automotive industry, urethane adhesive compositions are used to bond glass objects such as windshield, backlight window and quarter glass into the car body structure. In order to provide adequate rigidity and thus better noise, vibration, and harshness (NVH) performance of a car, it's ideal to have urethane adhesive compositions with high modulus performance after they are cured in place. In addition to high modulus, it is also advantageous if such urethane adhesive composition is usable and is also pump transferable at room temperature. Furthermore, it is ideal if the urethane adhesive composition can be used without the need of a paint primer on the car body structure.

Currently, high modulus urethane adhesive compositions can be achieved through the use of rigid polymer resins, e.g. crystalline polyester resins and/or acrylic resins. These compositions typically need the heating during manufacturing and/or application. Furthermore, these compositions typically have high viscosities and therefore difficult to be pumped at room temperature.

SUMMARY OF THE INVENTION

The present invention provides a urethane adhesive composition with desirable characteristics. The urethane adhesive composition of the present invention contains a) urethane prepolymer resin; b) aromatic polyisocyanate compounds or a blend of aromatic polyisocyanates and aliphatic polyisocyanates; c) catalysts such as organic amines and metal carboxylates for moisture cure; and d) fillers such as carbon black, inorganic fillers (clay, calcium carbonate etc.). The compositions of the present invention can be produced at room temperature and are pump transferable without the need of heating.

BRIEF DESCRIPTION OF THE DRAWINGS

FIG. 1 illustrates the E' values versus temperature for Samples 4 to 7 and Comparative Sample A.

DETAILED DESCRIPTION OF THE INVENTION

The present invention provides a urethane adhesive composition comprising a urethane prepolymer resin, a polyisocyanate, a catalyst such as an organic amine or a metal carboxylate compound; and a filler.

The specific information about the ingredients/components used in the present invention is described as follows:

Voronol™ 220-056 is polyoxypropylene diol, having a number average molecular weight of 2000 and is available from The Dow Chemical Company.

Voronol™ 232-036 is polyoxypropylene triol, having a number average molecular weight of 4500 and is available from The Dow Chemical Company.

MDI is methylene diphenyl diisocyanate available from The Dow Chemical Company.

METACURE™ T-9 is a stannous octoate catalyst available from Air Products Inc.

DABCO™ DC21 is dibutyl tin dicarboxylate available from Air Products Inc.

Platinol™ N is diisononyl phthalate plasticizer available from BASF Co.

JEFFCAT™ DMDEE is dimorpholino diethyl ether catalyst available from Huntsman Chemical Co.

ELFTEX™ 57100 is a standard carbon black available from Cabot Co.

Clay used in the Examples is available from Burgess Pigment Co.

Desmodur™ N3300 is hexamethylene diisocyanate trimers, available from Bayer Co.

PAPI™ 20 is polymeric methylene diphenyl diisocyanate available from The Dow Chemical Company.

Vestanat™ IPDI is isophorone diisocyanate available from Evonik Degussa Company.

BETASEAL™ 43532 primer is an isocyanate containing primer available from The Dow Chemical Company.

PTSI™ is p-Toluenesulfonyl Isocyanate available from VANDEMARK CHEMICAL CO.

Carbon black is available from Cabot Company.

Urethane prepolymer resins are preferably prepared by the reaction between polyoxypropylene diol, polyoxypropylene triol, and methylene diphenyl diisocyanate in the presence of a catalyst and with dialkyl phthalate as solvent as shown in the example of making Prepolymer 1. Generally, the urethane prepolymer resins for use in preparing the composition of the invention have an average isocyanate functionality of at least about 2.0 and a molecular weight (weight average) of at least about 2,000. Preferably, the average isocyanate functionality of the urethane prepolymer resin is at least about 2.2, and is more preferably at least about 2.4. Preferably, the isocyanate functionality is no greater than about 4.0, more preferably no greater than about 3.5 and most preferably no greater than about 3.0. Preferably, the weight average molecular weight of the urethane prepolymer is at least about 2,500 and is more preferably at least about 3,000; and is preferably no greater than about 40,000, even more preferably no greater than about 20,000, more preferably no greater than about 15,000 and is most preferably no greater than about 10,000. The composition of the present invention contains about 25 to 75 wt. %, preferably about 30 to 70 wt. %, more preferably 35 to 65 wt. % of the urethane prepolymer resin.

Aromatic polyisocyanates or a mixture of aromatic and aliphatic polyisocyanates may be used as polyisocyanates in the present invention. In one embodiment of the present invention, the polyisocyanate comprises an aromatic polyisocyanate with a nominal functionality of more than 2.5. Examples of polyisocyanates suitable for use in present invention include PAPI™ 20 or Desmodur™ N3300. In preferred embodiments of the present invention, the composition contains no more than 10 wt. %, preferably no more than 7.5 wt. %, more preferably no more than 5 wt. %, and most preferably no more than 3 wt. % of aromatic polyisocyanates. Further, the composition of the present invention typically contain more than 0.1 wt. %, preferably more than 0.25 wt. %, more preferably more than 0.5 wt. %, and most preferably more than 0.75 wt. % of aromatic polyisocyanates.

For catalyst, both organic amine catalyst and organo metallic catalyst may be used alone or in combination with each other. Examples of organic amine include JEFFCAT™ DMDEE and alkyl substituted morpholino compounds. Examples of organo metallic catalyst include dialkyltin dicarboxylate.

In preferred embodiments where organic amine is used as the catalyst, the composition of the present invention typically contains no more than 2 wt. %, preferably no more than 1.5 wt. %, more preferably no more than 1 wt. %, and most preferably no more than 0.5 wt. % of organic amines. Further, the composition of the present invention typically contain more than 0.01 wt. %, preferably more than 0.1 wt. %, more preferably more than 0.15 wt. %, and most preferably more than 0.20 wt. % of organic amines.

In preferred embodiments where organo metallic catalysts are used, e.g. dialkyltin dicarboxylate, the organo metallic compounds are present in an amount of about 60 parts per million (ppm) or greater based on the weight of the composition, more preferably 120 parts by million or greater. Preferably the organo metallic compounds are present in an amount of about 1.0 wt. % or less based on the weight of the composition, more preferably 0.5 wt. % or less and most preferably 0.2 wt. % or less.

Typical fillers used in the present invention include carbon black, clay, calcium carbonate, thermoplastics, flame-retardant additives, and colorants used alone in combination with each other. The composition of the present invent comprises less than 35 wt. %, preferably less than 30, more preferably less than 25 wt. % of one or more fillers.

In some embodiments of the present invention, one or more stabilizers may also be added to the composition. Examples of stabilizers suitable for present composition include HALS (hindered amine), UV stabilizers, antioxidants, free radical scavengers, heat stabilizers. The amounts of stabilizers used in the composition can vary based on different applications.

Further, in some other embodiments, a moisture scavenger may be used in the composition. Suitable moisture scavengers include methyl orthoformate (Bayer OF), PTSI™, calcium oxide, functional silanes or oxazolidines from The Dow Chemical Company. The amounts of moisture scavenger used in the composition can vary based on different applications.

To make the composition of the present invention, the process typically includes the following steps:
a. Mixing urethane prepolymer, one or more polyisocyanates and one or more catalysts under vacuum.
b. Breaking vacuum with nitrogen; then add fillers to the mixture.
c. Mixing again under vacuum. Then charge stabilizers if used, and mix again.
d. Breaking vacuum with nitrogen and transfer prepared adhesive into air tight tubes.

In one embodiment, the one or more catalysts were added after fillers in the process of making the present composition. No significant difference was noticed due to this change of adding sequence.

EXAMPLES

Some embodiments of the invention will now be described in detail in the following Examples, wherein all parts and percentages are by weight unless otherwise specified.

Test Procedures used in the present invention can be described as follows:

Viscosities of prepolymers as described herein are determined according to the procedure disclosed in Bhat, U.S. Pat. No. 5,922,809 at column 12, lines 38 to 49, incorporated herein by reference. Viscosities of adhesives as described herein are determined using press flow. The press flow is the time it takes for 20 grams of adhesive to pass through a 0.157 inch (4.0 mm) orifice under 80 psi (552 kPa) pressure. 3 day-54° C. heat age press flow is measured on the adhesive sample after 3 day 54° C. heat treatment.

Tensile strength is determined according to ASTM D412, Die C. Young's Modulus is determined according to ASTM D412, Die C. These tests are completed on an Instron test apparatus.

The sag test is carried out using the following procedure below. A metal panel of 10 cm height and 30 cm long is standing up vertically on the bench with the its length sitting on the bench. A right angle triangle bead of the adhesive composition of 1.8 cm height and 0.6 cm base is dispensed along the top edge of the panel with the base touching the panel and the height perpendicular to the top edge of the panel. After 30 minutes, the sag at the tip of the adhesive composition is measured and recorded (in millimeter). The sag can be run on either the fresh material or the heat aged material.

Quick knife adhesion (QKA) test is run according to the following. An adhesive bead of 6.3 mm (width)×6.3 mm (height)×100 mm (length) is placed on the tested substrate and the assembly is cured for a specific time at 23° C. and 50 percent RH (relative humidity). When tested, a slit (20-40 mm) is made between the adhesive end and the substrate. The cured bead is then cut with a razor blade at a 45° angle while pulling back the end of the bead at 180° angle to the substrate. The degree of adhesion is evaluated as adhesive failure (AF) and/or cohesive failure (CF). In case of AF, the cured bead can be separated from the substrate and in case of CF, separation occurs only within the adhesive bead as a result of knife cutting.

Storage modulus (E' modulus) is measured by dynamic mechanical analyzer ("DMA"). Sample dimension is 4 to 5 mm thickness, 60 mm in length and 12 mm in width. Tested sample is placed on the dual cantilever clamp with 35 mm between the two clamps. The frequency is 1 Hz and amplitude is 150 micrometer. Temperature is scanned from −40° C. to 100° C. Both storage modulus (E') and loss modulus (E") are reported.

G modulus at 10% strain is obtained from lap shear samples. The lap shear sample is prepared according to the following. First, two steel coupons of 25 mm by 100 mm were primed with Betaseal™ 43533ATU. A bead of adhesive composition is applied along the width and at the primed end of the first steel coupon. The primed end of a second steel coupon is immediately pressed on the adhesive bead so that the adhesive bead has a final dimension of 6 mm height, 10 mm width and 25 mm height. The sample is allowed to cure under conditions of 23° C. and 50 percent relative humidity (RH) for about 10 days. The lap shear sample is then pulled at a rate of 4 inch/minute (100 mm/min) with an Instron Tester. G modulus is then calculated by the program according to the equation: $G=(P \times t)/(A \times d)$; P=load in Newton, A=bond area (mm2), t=bond height (mm), d=displacement at 10% strain (mm). An average of five lap shear samples is reported for the adhesive G modulus.

Preparation of Urethane Prepolymer Resin:

Prepolymer 1 is prepared by chemically reacting components in their amounts as listed below.

| Chemical Name | Wt % | Weight (g) |
| --- | --- | --- |
| Voranol 220-056 Polyol | 22.730% | 363.68 |
| Voranol 232-036 Polyol | 32.940% | 527.04 |
| Palatinol N (part I) | 2.000% | 32.00 |
| MDI | 10.040% | 160.64 |
| Metacure T-9 | 0.005% | 0.08 |
| Palatinol N (part II) | 31.325% | 501.20 |
| Diethyl Malonate | 0.960% | 15.36 |
| total | 100.00% | 1600.0 |

Preparation procedure:
a. Adding diol and triol and Palatinol N (part I) into kettle and mix, heat under nitrogen. Set the temperature at 54° C.
b. Adding MDI into kettle when the temperature reaches 54° C.
c. Adding the T-9 drop-wise and slowly. Once temperature rises, stop adding T-9 and record # of drops. Observe and record for exothermic temp. Once the peak temp is reached, hold reaction mixture at 80° C. or above (less than 90° C.) for 60 minutes
d. Setting the temperature at 60° C. Add Palatinol N (part II), and DEM in and mix for 30 minutes. Get a sample for NCO.
e. Packaging under nitrogen and measure the viscosity at room temperature.

The urethane prepolymer resin prepared with the above procedure ("Prepolymer 1") has a viscosity measured at 25° C. of about 11160 cps and a NCO of about 1.49%.

Preparation of Urethane Adhesive Composition Samples:

The comparative sample (Sample A) is prepared by adding the stated amount of Prepolymer 1, DMDEE, DABCO DC21, Desmodur N-3300 hexamethylene diisocyanate trimer if any, and PAPI 20 if any into a 2 gallon mixer. The mixture is degassed under vacuum and mixed for 15 minutes. The vacuum is broken and both carbon black and clay, previously oven dried and cooled to room temperature, are added. The vacuum is applied slowly. When half of the vacuum is achieved, mixing is started to wet out the fillers for 2 minutes. The vacuum valve is then fully opened and mixing is continued under full vacuum for 15 minutes. Thereafter, the vacuum is broken again and the mixture is scraped down. The full vacuum is applied again and the mixture is mixed under vacuum for another 5 minutes. Then, the vacuum is removed with nitrogen and the adhesive composition is packaged into sealed tubes and stored in aluminum bags.

Samples 1 to 10 are examples of embodiments of the present invention.

Samples 1 to 3 containing polyisocyanate Desmodur N3300, are similarly prepared with various components as listed below.

| | Sample ID | | |
| --- | --- | --- | --- |
| | Sample 1 Wt % | Sample 2 Wt % | Sample 3 Wt % |
| Prepolymer I | 57.58% | 56.58% | 55.58% |
| DMDEE | 0.28% | 0.28% | 0.28% |
| DABCO DC-21 | 0.14% | 0.14% | 0.14% |
| Desmodur N3300 | 1.00% | 2.00% | 3.00% |
| PAPI20 | | | |
| Carbon Black | 15.00% | 15.00% | 15.00% |
| Clay | 26.00% | 26.00% | 26.00% |
| SUM | 100.00% | 100.00% | 100.00% |

Samples 4 to 7, in accordance with the present invention and containing polyisocyanate PAPI 20, are similarly prepared with various components as listed below.

| | Sample 4 Wt % | Sample 5 Wt % | Sample 6 Wt % |
| --- | --- | --- | --- |
| Prepolymer 1 | 57.58% | 56.58% | 55.58% |
| DMDEE | 0.28% | 0.28% | 0.28% |
| DABCO DC-21 | 0.14% | 0.14% | 0.14% |
| Desmodur N3300 | | | |
| PAPI20 | 1.00% | 2.00% | 3.00% |
| Carbon black | 15.00% | 15.00% | 15.00% |
| Clay | 26.00% | 26.00% | 26.00% |
| SUM | 100.00% | 100.00% | 100.00% |

| | Sample 7 Wt % |
| --- | --- |
| Prepolymer I | 53.68% |
| DMDEE | 0.18% |
| DABCO DC-21 | 0.14% |
| Desmodur N3300 | |
| PAPI20 | 5.00% |
| Carbon black | 15.00% |
| Clay | 26.00% |
| SUM | 100.00% |

Samples 8 to 10 containing IPDI are similarly prepared with various components as listed below.

| | Sample 8 Wt % | Sample 9 Wt % | Sample 10 Wt % |
| --- | --- | --- | --- |
| Prepolymer 1 | 57.58% | 56.58% | 55.58% |
| DMDEE | 0.28% | 0.28% | 0.28% |
| DABCO DC-21 | 0.14% | 0.14% | 0.14% |
| IPDI | 1.00% | 2.00% | 3.00% |
| PAPI 20 | | | |
| Carbon black | 15.00% | 15.00% | 15.00% |
| Clay | 26.00% | 26.00% | 26.00% |
| SUM | 100.00% | 100.00% | 100.00% |

Storage modulus (E') is measured by DMA. Table 1 provides the E' modulus results for comparative Sample A and comparative Samples 1 through 3. Samples 1 to 3 have higher modulus than that of Sample A. As the content of N3300 in samples increases, E' values of the samples also increase.

TABLE 1

Storage Modulus Results

| Sample ID | Sample A | Sample 1 | Sample 2 | Sample 3 |
|---|---|---|---|---|
| N3300 content in samples<br>DMA, 1 Hz (7 d cure CT)<br>1 Hz, 2° C./min, 150 um<br>amplitude, 5 mm thickness ×<br>60 mm length × 12 mm width | 0 | 1% | 2% | 3% |
| E' modulus at 23 C. (3 x), MPa | 9.04 | 12.57 | 17.77 | 18.72 |
| E' modulus at 35 C. (3 x), MPa | 7.53 | 10.23 | 15.18 | 15.39 |
| E' modulus at 60 C. (3 x), MPa | 6.18 | 7.74 | 11.46 | 11.39 |

Table 2 lists the storage modulus (E') results for Samples 4 to 7. Samples 4 to 7 have higher modulus than that of Sample A. As the content of PAPI 20 in the samples increases, the storage modulus has also increased. Comparing Samples 1 to 3 with Samples 4 to 7, it is found surprisingly that samples containing PAPI 20 at the equal weight percentage amounts have much higher modulus than those containing N3300. This higher value of modulus is also true for higher temperatures.

Values contained in Table 2 also can be charted in FIG. 1 to further illustrate the significant improvement of the present invention over the comparative samples.

TABLE 2

More Storage Modulus Results

| Sample ID | Sample A | Sample 4 | Sample 5 | Sample 6 | Sample 7 |
|---|---|---|---|---|---|
| PAPI 20 content in sample<br>DMA, 1 Hz (7 d cure CT)<br>1 Hz, 2 C./min, 150 um<br>amplitude, 5 mm thickness ×<br>60 mm length × 12 mm width | 0 | 1% | 2% | 3% | 5% |
| E' modulus at 23 C. (3 x) | 9.04 | 17.62 | 30.38 | 34.40 | 55.68 |
| E' modulus at 35 C. (3 x) | 7.53 | 14.50 | 25.79 | 29.03 | 47.98 |
| E' modulus at 60 C. (3 x) | 6.18 | 11.03 | 19.88 | 22.50 | 37.36 |

Table 3 lists the storage modulus for comparative Samples 8 to 10. These samples show similar increase in storage modulus to comparative Samples 1 to 3 but not as dramatic increase as those of samples 4 to 7 of this invention.

TABLE 3

More Storage Modulus Results

| Sample ID | Sample A | Sample 8 | Sample 9 | Sample 10 |
|---|---|---|---|---|
| DMA, 1 Hz (7 d cure CT) | | | | |
| E' modulus at 23 C. (3 x) | 9.04 | 12.66 | 14.96 | 17.04 |
| E' modulus at 35 C. (3 x) | 7.53 | 10.92 | 12.98 | 14.76 |
| E' modulus at 60 C. (3 x) | 6.18 | 8.78 | 10.44 | 11.87 |

Table 4, 5 and 6 list the Shear Modulus (G) results determined on the fully cured samples by Instron at 10% strain. Similar results as the Storage Modules are observed, i.e. the most dramatic increase in shear modulus is observed from Samples 4 to 7 containing aromatic polyisocyanate.

TABLE 4

Shear Modulus Results

| Sample ID | Sample A | Sample 1 | Sample 2 | Sample 3 |
|---|---|---|---|---|
| G @10% tangent, MPa | 1.66 | 2.12 | 2.33 | 2.64 |

TABLE 5

More Shear Modulus Results

| Sample ID | Sample A | Sample 4 | Sample 5 | Sample 6 | Sample 7 |
|---|---|---|---|---|---|
| G @10% tangent, MPa | 1.66 | 2.47 | 3.18 | 4.07 | 4.82 |

TABLE 6

More Shear Modulus Results

| Sample ID | Sample A | Sample 8 | Sample 9 | Sample 10 |
|---|---|---|---|---|
| G @10% tangent, MPa | 1.66 | 1.72 | 1.98 | 2.24 |

Tables 7, 8 and 9 show the Young's Modulus of the samples. All samples have much higher Young's Modulus than that of the comparative Sample A. Samples containing aromatic polyisocyanate show the most significant increase for the Young's modulus.

TABLE 7

Results on Tensile Strength and Young's Modulus

| Sample ID | Sample A | Sample 1 | Sample 2 | Sample 3 |
|---|---|---|---|---|
| Young's Modulus (1-10%) | 4.93 ± 0.18 MPa | 6.35 ± 0.16 MPa | 7.25 ± 0.14 MPa | 8.37 ± 0.16 MPa |

TABLE 8

More Results on Tensile Strength and Young's Modulus

| Sample ID | Sample A | Sample 4 | Sample 5 | Sample 6 | Sample 7 |
|---|---|---|---|---|---|
| Young's Modulus (1-10%) | 4.93 ± 0.18 MPa | 7.61 ± 0.20 MPa | 10.39 ± 0.22 MPa | 13.16 ± 0.31 MPa | 18.54 ± 0.72 MPa |

TABLE 9

More Results on Tensile Strength and Young's Modulus

| Sample ID | Sample A | Sample 8 | Sample 9 | Sample 10 |
|---|---|---|---|---|
| Young's Modulus (1-10%) | 4.93 ± 0.18 MPa | 5.85 ± 0.11 MPa | 6.46 ± 0.12 MPa | 7.53 ± 0.32 MPa |

Tables 10, 11 and 12 show the viscosities of these samples. Their viscosities are low enough at room temperature so that compositions are pump transferable. The samples of the present invention have about the same viscosities of the comparative sample. Results from sag test on heat aged samples show that samples with aromatic polyisocyanate have the best sag resistant performance.

TABLE 10

Viscosity results of the samples

| Sample ID | Sample A | Sample 1 | Sample 2 | Sample 3 |
|---|---|---|---|---|
| PF Initial, seconds, 80 psi/0.157" | 24, 23 s 25.1 C. | 24, 24 s 25.2 C. | 25, 25 s 25.3 C. | 25, 25 s 25.1 C. |
| PF 3 days at 54 C., seconds, 80 psi/0.157" | 27, 27 s 25.4 C. | 26, 26 s 25.2 C. | 28, 28 s 25.3 C. | 27, 28 s 25.2 C. |
| Sag after 3 days at 54 C. | 1 mm | 1 mm | 4 mm | 3 mm |

TABLE 11

More viscosity results of the samples

| Sample ID | Sample A | Sample 4 | Sample 5 | Sample 6 | Sample 7 |
|---|---|---|---|---|---|
| PF Initial, sec, 80 psi/0.157" | 24, 23 s 25.1 C. | 25, 24 s 25.2 C. | 27, 26 s 25.1 C. | 30, 30 s 25.2 C. | 48, 49 s 25.2 C. |
| PF 3 days at 54 C., seconds, 80 psi/0.157" | 27, 27 s 25.4 C. | 26, 25 s 25.4 C. | 27, 26 s 25.2 C. | 30, 30 s 25.4 C. | 48, 48 s 25.0 c. |
| Sag after 3 days at 54 C. | 1 mm | 0 mm | 0 mm | 0 mm | 0 mm |

TABLE 12

| Sample ID | Sample A | Sample 8 | Sample 9 | Sample 10 |
|---|---|---|---|---|
| More viscosity results of the samples | | | | |
| PF Initial, sec, 80 psi/0.157" | 24, 23 s 25.1 C. | 27, 27 s 25.4 C. | 27, 28 s 25.4 C. | 25, 25 s 25.3 C. |
| PF 3 days at 54 C., seconds, 80 psi/0.157" | 27, 27 s 25.4 C. | 32, 32 s 25.1 C. | 31, 30 s 25.0 C. | 29, 30 s 25.1 C. |
| Sag after 3 days at 54 C. | 1 mm | 3 mm | 2 mm | 3 mm |

Table 13 shows the adhesion performance of the urethane adhesive compositions of the present invention. All samples of Samples 4 to 7 have shown the direct adhesion capability towards painted metal substrates with 100% cohesive failure (100% CF).

TABLE 13

Adhesion performance results of the samples

| | Sample ID | | | |
|---|---|---|---|---|
| QKA Primerless: | Sample 4 | Sample 5 | Sample 6 | Sample 7 |
| MAC8000 paint: | | | | |
| 7 d initial, | 100 CF | 100 CF | 100 CF | 100 CF |
| 7 d initial and 14 d 100/100, | 100 CF | 100 CF | 100 CF | 100 CF |
| Uregloss paint: | | | | |
| 7 d initial, | 100 CF | 100 CF | 100 CF | 100 CF |
| 7 d initial and 14 d 100/100, | 100 CF | 100 CF | 100 CF | 100 CF |

The invention claimed is:

1. A urethane adhesive composition comprising:
   a) more than about 25 wt % of a urethane prepolymer resin consisting essentially of a reaction product of polyoxypropylene diol, polyoxypropylene triol, and methylene diphenyl diisocyanate, reacted in the presence of a catalyst;
   b) more than about 0.75 wt % to no more than about 7.5 wt % of aromatic polyisocyanate having a nominal functionality of more than 2.5, combined with the urethane prepolymer after the reaction product is prepared;
   c) more than about 0.1 wt % of an organic amine and more than about 60 ppm of a dialkyltin dicarboxylate catalyst compound, for moisture cure;
   d) a filler;
   e) a dialkyl phthalate; and
   f) an aliphatic polyisocyanate;
   wherein the composition is free of crystalline polyester so that the composition can be produced at room temperature and is pump transferrable without the need for heating;
   wherein the composition exhibits direct adhesion capability toward painted metal substrates; and
   wherein the composition has a sag distance of less than 1 mm.

2. The composition according to claim 1 comprising more than about 1 wt % to no more than about 7.5 wt % of aromatic polyisocyanate.

3. The composition according to claim 1, comprising no more than about 5 wt % of aromatic polyisocyanate.

4. The composition according to claim 3 comprising no more than about 3 wt % of aromatic polyisocyanate.

5. The composition of claim 1, wherein the composition exhibits the following properties: 100 percent cohesive failure to a painted metal substrate after 7 days of cure at 23° C. and 50% relative humidity; and 100 percent cohesive failure after 7 days of cure at 23° C. and 50% relative humidity and 14 days at 100° C. and 100% relative humidity.

6. The composition of claim 1 which contains:
   a) more than about 25 wt % to about 75 wt % of the urethane prepolymer resin;
   b) more than about 0.75 wt % to about 7.5 wt % of the aromatic polyisocyanate;
   c) more than about 0.1 wt % to about 2.0 wt % of the organic amine and more than about 60 ppm to about 1.0 wt % of the dialkyltin dicarboxylate catalyst compound; and
   d) less than about 35 wt % of the filler.

7. The composition of claim 1 which further comprises one or more of the following ingredients: one or more stabilizers; and a moisture scavenger.

* * * * *